United States Patent
Tsyrganovich et al.

(10) Patent No.: US 9,705,417 B2
(45) Date of Patent: Jul. 11, 2017

(54) LOW FORWARD VOLTAGE RECTIFIER

(71) Applicant: IXYS Corporation, Milpitas, CA (US)

(72) Inventors: Anatoliy V. Tsyrganovich, Woodside, CA (US); Leonid A. Neyman, Sunnyvale, CA (US)

(73) Assignee: IXYS Corporation, Milpitas, CA (US)

( * ) Notice: Subject to any disclaimer, the term of this patent is extended or adjusted under 35 U.S.C. 154(b) by 49 days.

(21) Appl. No.: 14/955,037

(22) Filed: Nov. 30, 2015

(65) Prior Publication Data

US 2017/0155339 A1   Jun. 1, 2017

(51) Int. Cl.
*H02M 7/217*   (2006.01)
*H02M 7/219*   (2006.01)

(52) U.S. Cl.
CPC .................................. *H02M 7/219* (2013.01)

(58) Field of Classification Search
CPC ............ H02M 7/02; H02M 7/04; H02M 7/12; H02M 7/21; H02M 7/217; H02M 7/219
See application file for complete search history.

(56) References Cited

U.S. PATENT DOCUMENTS

| 5,510,972 | A | * | 4/1996 | Wong | H02M 7/219 363/125 |
| 7,269,038 | B2 | * | 9/2007 | Shekhawat | H02M 1/42 363/71 |
| 8,045,350 | B2 | * | 10/2011 | Sells | H02M 7/219 363/127 |
| 2003/0095423 | A1 | * | 5/2003 | Hirst | H02M 7/219 363/127 |
| 2005/0207195 | A1 | * | 9/2005 | Olsson | H02J 9/062 363/125 |

* cited by examiner

*Primary Examiner* — Gary L Laxton
(74) *Attorney, Agent, or Firm* — Imperium Patent Works; T. Lester Wallace

(57) ABSTRACT

A rectifier includes a larger Field Effect Transistor (FET1) and a smaller FET (FET2). A sense resistor is in series with FET2's body diode between a cathode terminal and an anode terminal. If the cathode terminal voltage is greater than the voltage on the anode terminal, then body diodes of FETs are reverse biased, the FETs are controlled to be off, and there is no current flow through the rectifier. If, however, the voltage on the anode terminal becomes positive with respect to the cathode terminal, then the body diode of FET2 starts to conduct and there is a voltage drop across the sense resistor. A comparator detects this condition and turns both FETs on. The rectifier is then conductive, so current can flow from the anode terminal, through the larger FET1, and to the cathode terminal, with a small forward voltage drop and without passing across the sense resistor.

31 Claims, 4 Drawing Sheets

CIRCUIT DIAGRAM OF SYNTHETIC DIODE CIRCUIT MODULE

SYMBOL OF THE SYNTHETIC DIODE
CIRCUIT MODULE

FIG. 1

SYMBOL OF THE RECTIFIER
MODULE

FIG. 3

CIRCUIT DIAGRAM OF SYNTHETIC
DIODE CIRCUIT MODULE

WAVEFORMS FOR FIG. 4

LOW FORWARD VOLTAGE RECTIFIER

TECHNICAL FIELD

The described embodiments relate generally to rectifiers, and more particularly to rectifiers having low forward voltages, and to related structures and methods.

BACKGROUND INFORMATION

In a rectifier, such as a rectifier that sees use in an AC-to-DC converter, there is power loss. When current is flowing through the rectifier, there is a forward voltage drop across the rectifier. If, for example, this rectifier is typical diode full bridge rectifier, then on the first phase of a cycle, an incoming AC signal current flows through two of the diodes of the bridge. There is a forward voltage drop across each of these diodes. The forward voltage drop at peak current flow may, for example, be about one volt. Then, in the second phase of the cycle of the incoming AC signal, current flows through the other two of the diodes of the bridge. Again, there is a forward voltage drop across each of these diodes. The voltage drop across each of these diodes may be about one volt at the time of peak current flow. The product of the instantaneous current flow through such a rectifier, multiplied by the instantaneous voltage drop across the rectifier, is the instantaneous power that is lost in the rectifier. Over one cycle of the incoming AC signal, the average power lost is the integral of the instantaneous voltage drop across the rectifier multiplied by the instantaneous current flow through the rectifier, divided by the period of the cycle. Reducing this average power loss is desirable.

Circuits and techniques have been proposed to reduce such power loss. In one type of circuit, the rectifier includes a field effect transistor. A voltage detector circuit detects the voltage between the source and drain of the field effect transistor. If the voltage is negative, then the voltage detector supplies a signal onto the gate of the field effect transistor such that the transistor is controlled to be off. If, however, the voltage is detected to be positive, then the voltage detector supplies a signal onto the gate of the field effect transistor such that the transistor is controlled to be on. The overall circuit can therefore be considered to be a synthetic rectifier or a synthetic diode. The overall circuit acts like a diode in that it conducts current between source and drain if there is a positive voltage across the device, whereas it does not conduct current if there is a negative voltage across the device. If the forward voltage drop across the device when it is conducting current is less than the forward voltage drop that would otherwise occur across a diode, then using the synthetic diode circuit in place of a diode in a rectifier can serve to reduce power loss. The article entitled "Diode Simulator Reduces Forward Drop To 0.04V", EDN Magazine, page 212, by Isaac Eng (Jul. 20, 1992) sets for one example of such a circuit. In another type of circuit, a bipolar transistor and a parallel-connected diode are used in place of a rectifier diode. If the voltage across the bipolar transistor device is negative, then associated circuitry controls the bipolar transistor to be off. Current does not flow through the bipolar transistor, and the diode is reverse biased so current does not flow through the parallel-connected diode. If, however, there is current flow due to a forward voltage condition, then the associated circuitry supplies a base current to the bipolar transistor such that the bipolar transistor is controlled to turn on. The forward voltage drop across the bipolar transistor and the parallel-connected diode when the bipolar transistor is controlled to be on in this way can be as small as 0.1 volts. U.S. Pat. No. 8,649,199, entitled "Low Forward Voltage Rectifier", filed on Oct. 29, 2011, issued on Feb. 11, 2014, by Kyoung Wook Seok, sets forth an example of such a low forward voltage rectifier circuit. There are various advantages and drawbacks of these two types of circuits.

SUMMARY

In a first novel aspect, a synthetic diode rectifier circuit includes a first Field Effect Transistor (FET), a second FET, a sense resistor, and a comparator. The gates of the first and second FETs are coupled together, and the drains of the first and second FETs are coupled together, but the source of the second FET is not directly connected to the drain of the first FET. In one example, the first and second FETs are parts of the same semiconductor die. The source of the first FET is a bond pad and the source of the second FET has another bond pad. The sense resistor is disposed in a current path that extends from an anode terminal of the rectifier circuit, through the sense resistor, to the source of the second FET, through a body diode of the second FET, to the drain of the second FET, and to a cathode terminal of the rectifier circuit. This current path does not extend through the first FET.

In operation, if the voltage on the cathode terminal is greater than the voltage on the anode terminal, then there is no appreciable current flow through the synthetic diode circuit. The body diodes of the first and second FETs are reverse biased. Because the body diode of the second FET is reverse biased, there is no current flow across the sense resistor. The comparator detects this no current condition and in response causes a control signal to be supplied onto the gates of the first and second FETs that keeps the first and second FETs off and nonconductive. Accordingly, there is no current flow from the cathode terminal of the synthetic diode rectifier circuit, through the circuit, and to the anode terminal of the synthetic diode rectifier circuit. In this sense, the synthetic diode rectifier circuit is operating as a reverse biased diode.

If, however, the voltage on the anode terminal becomes positive with respect to the voltage on the cathode terminal, then the body diode of the second FET becomes forward biased and starts to conduct current. This current flows across the sense resistor. The resulting voltage drop across the sense resistor is detected by the comparator. The comparator responds by causing the control signal that is supplied onto the gates of the first and second FETs to turn the first and second FETs on. Current can then flow in a current path into the synthetic diode rectifier circuit via the anode terminal, to the source of the first FET, through the first FET, to the drain of the first FET, and out of the synthetic diode rectifier circuit via the cathode terminal. There is no sense resistor in this main current path through the first FET. The first FET is substantially larger than the second FET, so most of the current flow through the overall synthetic diode rectifier circuit passes through the first FET without passing across the sense resistor. The first and second FETs are driven to be saturated and fully on and conductive, so the forward voltage drop across the rectifier circuit is approximately the $V_{DS(ON)}$ of the FETs. This $V_{DS(ON)}$ voltage is smaller than the forward voltage drop across a standard diode.

In one example, the forward voltage drop across the overall synthetic diode rectifier circuit from the anode terminal to the cathode terminal is approximately 0.4 volts. Within the synthetic diode rectifier circuit, the differential input leads of the comparator are not connected across the source and drain of either the first or second FET, but rather the differential input leads of the comparator are coupled across the sense resistor. Large voltages that might be present across the synthetic diode rectifier circuit between the external module cathode and anode terminals (such as when the rectifier circuit is blocking a high reverse voltage) are therefore not introduced onto the sensitive differential inputs of the comparator. Due to this sense resistor and comparator connection, the overall rectifier circuit is able to block high reverse blocking voltages of hundreds of volts while at the same time employing a relatively inexpensive and fast-responding comparator circuit.

In one example, the synthetic diode rectifier circuit is a three-terminal multi-chip module, with the three terminals being an anode module package terminal, a cathode module package terminal, and a supply voltage module package terminal. The synthetic diode rectifier circuit has no more than three terminals. The semiconductor devices of the module may be encapsulated by an amount of injection molded encapsulant such that the three-terminals of the module extend from the amount of encapsulant.

In some embodiments, an additional fourth ON module package terminal is provided. If the synthetic diode rectifier circuit is blocking a reverse voltage (the voltage on the cathode terminal is more positive than the voltage on the anode terminal), then driving a digital logic high level signal supplied onto the ON terminal will cause the FETs to turn on so that the synthetic diode rectifier circuit becomes conductive, thereby effectively shorting the cathode terminal to the anode terminal so that current can flow from the cathode terminal, through the rectifier circuit, and out of the anode terminal. When there is a reverse voltage across the synthetic diode rectifier circuit, the rectifier circuit can be selective controlled to block the reverse voltage or to conduct, depending on the state of the digital control signal supplied onto the ON module package terminal. The novel synthetic diode rectifier circuit sees many uses.

In a second novel aspect, a novel full bridge rectifier circuit includes two synthetic rectifier circuits Q3 and Q4 as described above as well as two other ordinary FETs Q2 and Q1. The four devices, namely the two rectifier circuits Q3 and Q4 and the two other FETs Q2 and Q1, are interconnected as a full bridge similar to the way four diodes are connected in an ordinary diode full bridge rectifier. If the voltage across the novel full bridge rectifiers is such that one of the rectifier circuits Q3 turns on, then another of the FETs Q2 is also turned on to be conductive as the diodes are conductive in an ordinary diode full bridge rectifier. More particularly, current flow through the body diode of the smaller FET Q3B of the synthetic rectifier circuit Q3 is detected. In response to the detection of this current, more than one of FET is turned on, namely the other larger FET Q3A of the synthetic rectifier circuit Q3 is turned on and also another FET Q2 (not a synthetic rectifier) is turned on. All the other FETs of the full bridge rectifier circuit are off and nonconductive.

If, on the other hand, the voltage across the full bridge rectifier is of the opposite polarity such that the other of the rectifier circuits Q4 turns on, then the other of the FETs Q1 is turned on to be conductive as the diodes are conductive in a diode full bridge rectifier. More particularly, current flow through the body diode of the smaller FET Q4B of the synthetic rectifier circuit is detected, and in response more than one of FET is turned on, namely the other larger FET Q4A of the synthetic rectifier circuit Q4 is turned on and also another FET Q1 (not a synthetic rectifier) is turned on. All the other FETs of the full bridge rectifier circuit are off and nonconductive. The voltage drop across the overall novel full bridge rectifier circuit is lower as compared to the voltage drop across a conventional diode full bridge rectifier.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
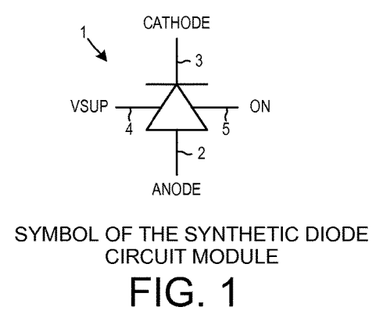
FIG. 1 is a symbol of a synthetic diode module circuit in accordance with one novel aspect.

FIG. 1 is a diagram of a symbol 1 of a synthetic diode module circuit 6 in accordance with one novel aspect. The symbol 1 has an anode lead or terminal 2, a cathode lead or terminal 3, a supply voltage input lead or terminal 4, and a ON input lead or terminal 5. The represented synthetic diode module circuit 6 can be used in place of a diode in a rectifier circuit. If the appropriate DC supply voltage VSUP is supplied onto lead or terminal 4, and if the signal on the ON lead or terminal 5 is a digital logic low level (for example, zero volts with respect to the voltage on the anode lead or terminal 2), then the represented module circuit 6 acts like a diode in that if the voltage on the anode lead or terminal 2 with respect to the voltage on the cathode lead or terminal 3 is positive then the module conducts a current from the anode lead or terminal 2 to the cathode lead or terminal 3, whereas if the voltage on the anode lead or terminal 2 with respect to the voltage on the cathode lead or terminal 3 is negative then the module does not conduct current between the anode lead or terminal 2 and the cathode lead or terminal 3. If the appropriate DC supply voltage VSUP is supplied onto lead or terminal 4, and if the signal on the ON lead or terminal is a digital logic high level (for example, >2.5 volts with respect to the voltage on the anode lead or terminal 2), then the module circuit 6 can conduct current in either direction. If there is a positive voltage on the cathode lead or terminal 3 with respect to the anode lead or terminal 2, then current is conducted from terminal 3 to terminal 2.

Figure 2:
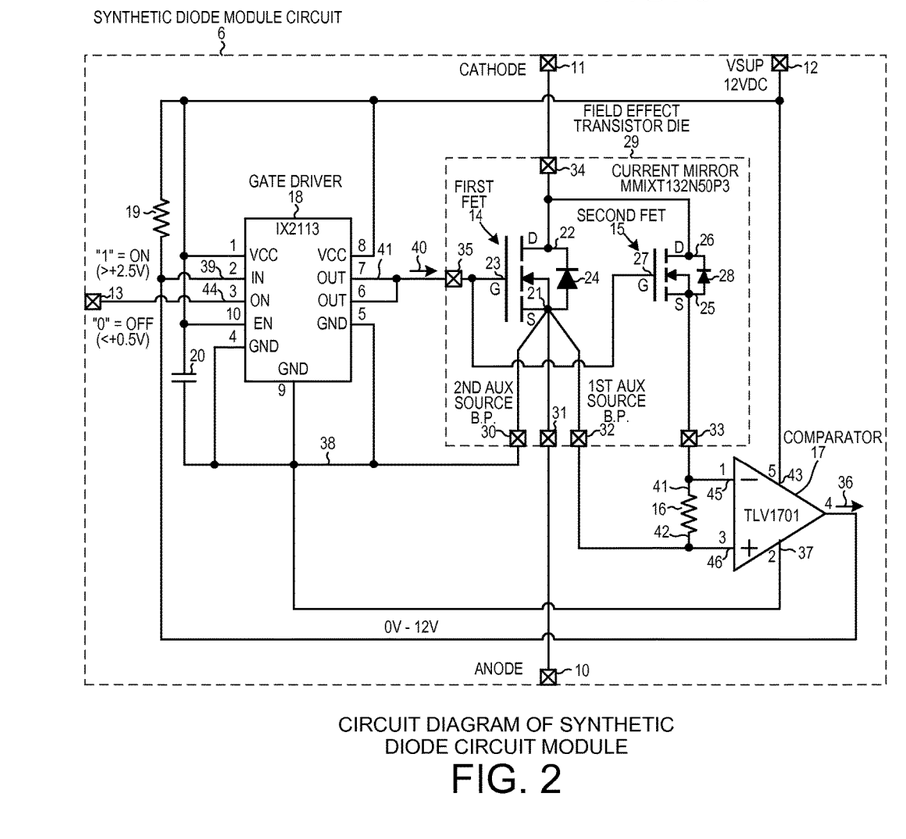
FIG. 2 is a circuit diagram of one embodiment of the synthetic diode module circuit of FIG. 1.

FIG. 2 is a circuit diagram of one embodiment of the synthetic diode module circuit 6 of FIG. 1. The module circuit 6 has four module package terminals 10, 11, 12 and 13. Anode module package terminal 10 corresponds to symbol lead or terminal 2. Cathode module package terminal 11 corresponds to symbol lead or terminal 3. Supply voltage module package terminal 12 corresponds to symbol lead or terminal 4. ON module package terminal 13 corresponds to symbol lead or terminal 5.

In addition to the module package terminals 10-13, the circuit 6 includes a first larger Field Effect Transistor (FET) 14, a second smaller FET 15, a sense resistor 16, a comparator 17, a gate driver 18, a pull-up resistor 19, and a bypass capacitor 20. The first larger FET has a source lead or terminal 21, a drain lead or terminal 22, a gate lead or terminal 23, and a body diode 24. The body diode 24 is the inherent diode of the field effect transistor device. The second smaller FET 15 has a source lead or terminal 25, a drain lead or terminal 26, a gate lead or terminal 27, and a body diode 28. The first larger FET has a first channel width, and the second smaller FET has a second channel width. The second channel width is substantially smaller than the first channel width. The first and second FETs are parts of the same semiconductor device die 29. The die 29 has bond pads 30-35.

In operation, if twelve volts DC is present on the VSUP module package terminal 12, and if the signal on the ON module package terminal 13 is a digital logic low level (for example, a voltage less than 0.5 volts with respect to the voltage on the anode module package terminal 10), then if the voltage on the anode module package terminal 10 is negative with respect to the voltage on the cathode module package terminal 11 then the body diodes 24 and 28 are reverse biased and do not conduct. Because body diode 28 does not conduct, there is no appreciable current flow through the sense resistor 16. The signal 36 output by the comparator 17 has the low voltage on the comparator's ground lead 37. This low voltage is zero volts, due to the ground lead 37 of the comparator being coupled to the anode module package terminal 10 through node and conductor 38, bond pad 30, and bond pad 31. This zero volt signal 36 is supplied onto the IN input lead and terminal 39 of the gate driver 18, so that the gate driver 18 in turn supplies the low voltage signal in the form of buffered control signal 40 out of OUT lead and terminal 41 and onto the gate bond pad 35 of the die 29. This low voltage buffered control signal 40 causes the first and second FETs 14 and 15 to be off and nonconductive. The module circuit 6 therefore does not conduct current from the cathode module package terminal 11 to the anode module package terminal 10.

If, however, twelve volts DC is present on the VSUP module package terminal 12, and if the signal on the ON module package terminal 13 is at the digital logic low level, then if the voltage on the anode module package terminal 10 is positive with respect to the voltage on the cathode module package terminal 11 then the body diode 28 of the second FET 15 is forward biased. A small current then flows in a current path from the anode module package terminal 10, through first FET source bond pad 31, through first auxiliary FET source bond pad 32, to the second lead 42 of sense resistor 16, through the sense resistor 16, to the first lead 41 of sense resistor 16, through second FET source bond pad 33, through the forward biased body diode 28 of the second FET 15, through drain bond pad 34, and to the cathode module package terminal 11. This small current flow causes a voltage drop across the sense resistor 16. If there is such a positive voltage drop across the sense resistor 16 due to current flow from the second lead 42 of the sense resistor to the first lead 41 of the sense resistor, then the comparator 17 causes the signal 36 to a have the high voltage on the supply voltage lead 43 of the comparator 17. In the example circuit, the supply lead 43 of the comparator 17 is coupled to the VSUP module package terminal 12. Accordingly, the comparator 17 asserts the signal 36 to twelve volts. The twelve volt signal 36 is supplied onto the IN input lead and terminal 39 of the gate driver 18. The gate driver 18 in turn supplies the buffered signal 40 at twelve volts onto the gate bond pad 35 of the die 29. This high voltage of signal 40 controls the first and second FETs to be on and conductive. Current can then flow from the source 21 to the drain 22 through the first FET 14 (as distinguished from current flow through body diode 24), and can then also flow from the source 25 to the drain 26 through the second FET 15 (as distinguished from current flow through body diode 28). When the first and second FETs are controlled to be fully on in this way, the forward voltage drop across these FETs is about 0.4 volts. The module circuit 6 therefore conducts current from the anode module package terminal 10 to the cathode module package terminal 11, and does so with a low forward voltage drop of about 0.4 volts. The larger current flow across the sense resistor 16 ensures that the first and second FETs continue to be controlled to be one and conductive.

If the module circuit 6 is properly powered with twelve volts DC present on the VSUP module package terminal 12, and if a positive voltage is present on the cathode module package terminal 11 with respect to the anode module package terminal 10, the module circuit 6 may nevertheless be made to conduct if a digital logic high level (for example, a voltage greater than 2.5 volts with respect to the voltage on the anode module package terminal) signal is present on the ON module package terminal 13. A digital logic level high signal being present on the ON lead and terminal 44 of the gate driver 18 causes the gate driver 18 to output a high voltage via output lead and terminal 41 onto the gates of the first and second FETs, regardless of the voltage of the signal on the IN lead and terminal 39 of the gate driver. This high voltage on their gates causes the first and second FETs to be turned on. Current can then flow from the cathode module package terminal 11 through the conductive first and second FETs, and to the anode module terminal 10 even though the signal 36 as output by the comparator 17 is low at ground potential. Accordingly, when the digital control signal ON is asserted, the module circuit 6 can conduct current from the cathode to the anode in a way not possible through an ordinary rectifying diode. When the cathode module package terminal 11 is positive with respect to the anode module package terminal 10 in this way, the module circuit 6 may be controlled to conduct, and not conduct, and conduct, and not conduct, back and forth, by changing the digital value of the ON control signal on the ON module package terminal 13.

Advantageously, the differential input leads 45 and 46 of the comparator 17 are not coupled across the anode and cathode module package terminals 10 and 11. In operation, in reverse blocking mode operation, a high voltage of two hundred volts or more may be present on the cathode module package terminal 11 with respect to the anode module package terminal 10. Advantageously, this high voltage is not applied across the differential input leads 45 and 45 of the comparator 17. A less expensive comparator circuit can therefore be employed that does not have input protection circuitry to protect against such high voltages. In addition, the second FET 15 is much smaller than the main first FET 14. The power loss across the sense resistor 16 is small or non-existent when the module circuit is on and conductive because the main current path through the module circuit 6 does not go through the sense resistor 16, but rather passes through the first FET 14.

In some embodiments, the comparator 17 drives the gates of the first and second FETs directly without any intervening gate driver. The gate driver 18 is only necessary if the comparator 17 cannot supply the high current pulses (a positive pulse to charge the FET gates when the FETs are being turned on, and a negative pulse to discharge the FET gates when the FETs are being turned off) adequately fast.

Figure 3:
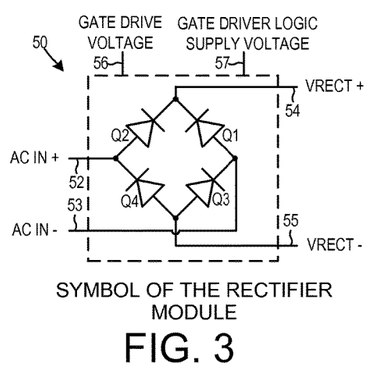
FIG. 3 is a symbol of a full bridge rectifier module circuit in accordance with one novel aspect.

FIG. 3 is a symbol 50 of a full bridge rectifier module circuit 51 in accordance with another novel aspect. The symbol 50 has an AC IN+ lead or terminal 52, an AC IN− lead or terminal 53, a VRECT+ lead or terminal 54, a VRECT− lead or terminal 55, a gate drive voltage lead or terminal 56, and a gate drive logic supply voltage lead or terminal 57. The represented full bridge rectifier module circuit 51 is usable in place of a standard diode full bridge rectifier.

Figure 4:
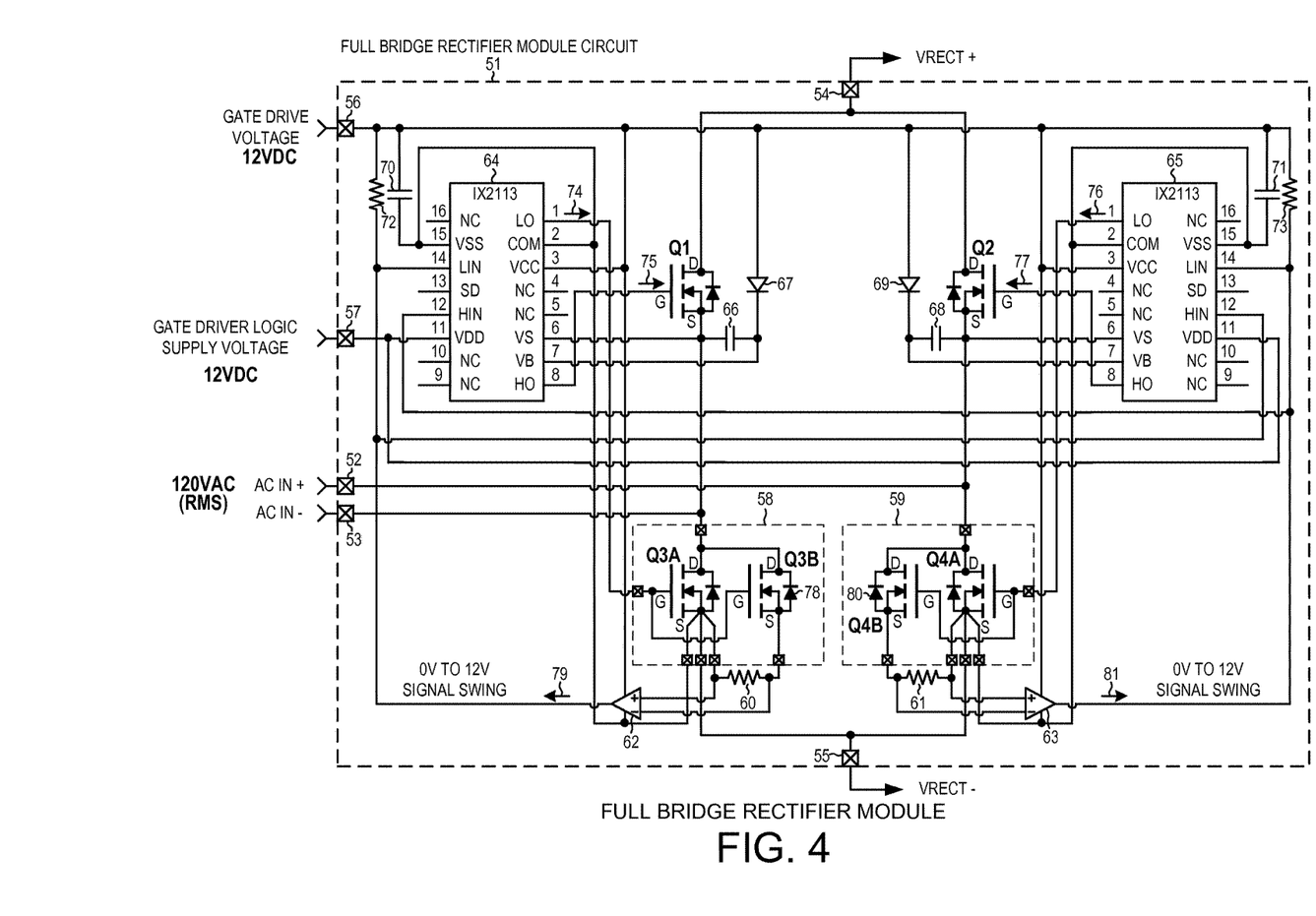
FIG. 4 is a circuit diagram of one embodiment of the full bridge rectifier module circuit of FIG. 3.

FIG. 4 is a circuit diagram of the full bridge rectifier module circuit 51. The module circuit 51 includes six FETs denoted Q1, Q2, Q3A, Q3B, Q4A and Q4B. FETs Q3A and Q3B are parts of the same semiconductor die 58. FETs Q4A and Q4B are parts of the same semiconductor die 59. The FETs are connected in a full bridge configuration as illustrated.

In addition to the six FETs, the module circuit 51 includes two sense resistors 60 and 61, two comparators 62 and 63, two gate driver devices 64 and 65, a first set of bootstrap components 66 and 67, a second set of bootstrap components 68 and 69, two bypass capacitors 70 and 71, and two pullup resistors 72 and 73. Gate driver device 64 actually includes a low side driver and a high side driver. The input of the low side driver is device terminal number 14 labeled LIN, and the output of the low side driver is device terminal number 1 labeled LO. The low side driver supplies a control signal 74 onto the gates of FETs Q3A and Q3B. The input of the high side driver is device terminal number 12 labeled HIN, and the output of the high side driver is device terminal number 8 labeled HO. The high side driver supplies a control signal 75 onto the gate of FET Q1.

Similarly, gate driver device 65 actually includes a low side driver and a high side driver. The input of the low side driver is device terminal number 14 labeled LIN, and the output of the low side driver is device terminal number 1 labeled LO. The low side driver supplies a control signal 76 onto the gates of FETs Q4A and Q4B. The input of the high side driver is device terminal number 12 labeled HIN, and the output of the high side driver is device terminal number 8 labeled HO. The high side driver supplies a control signal 77 onto the gate of FET Q2. In one example, the gate driver devices 64 and 65 are derivatives of IX2113 gate driver devices. IX2113 gate driver devices are available from IXYS Integrated Circuit Division of IXYS Corporation, 78 Cherry Hill Drive, Beverly, Mass. 01915.

In a first phase of an 120 VAC supply voltage present on the AC IN+ and AC IN− terminals, when the voltage between the AC IN+ and AC IN− terminals becomes positive (the voltage on AC IN+ terminal 52 becomes positive with respect to the voltage on AC IN− terminal 53) such that there develops a forward voltage across FET Q3B (the voltage on the source lead of Q3B becomes greater than the voltage on the drain lead of Q3B), then the body diode 78 of Q3B begins to conduct current. The resulting current flow causes a voltage drop across sense resistor 60. Comparator 62 detect this voltage drop and responds by asserting the control signal 79 high to the gate drive voltage (12V). The voltage of the control signal 79 transitions from ground potential to twelve volts. This control signal 79 is supplied onto the LIN input of the low side driver in gate driver device 64, so that the low side driver in turn asserts the low side control signal 74 to twelve volts. The twelve volts of the low side control signal 74 is supplied out of the LO output and onto the gates of FETs Q3A and Q3B, thereby turning FETs Q3A and Q3B on. The control signal 79 from comparator 62 is also supplied onto the HIN input of the high side driver in gate driver device 65. The high side driver therefore asserts the high side control signal 77 to be 11.3 volts higher than the voltage on the source of FET Q2, thereby turning FET Q2 on. At this point, FETs Q2, Q3A and Q3B are driven to be on and conductive, and FETs Q1 and Q4A and Q4B are controlled to be off and nonconductive. Current can flow from the AC IN+ terminal, through FET Q2 and out of the VRECT+ terminal, then through an external load, and into the VRECT− terminal, through FETs Q3A and Q3B, and out of the AC IN− terminal.

In a second phase of the 120 VAC supply voltage present on the AC IN+ and AC IN− terminals, when the voltage between the AC IN+ and AC IN− terminals becomes negative (the voltage on AC IN+ terminal 52 becomes negative with respect to the voltage on AC IN− terminal 53) such that there develops a positive voltage across FET Q4B (the voltage on the source lead of Q4B becomes greater than the voltage on the drain lead of Q4B), then the body diode 80 of Q4B begins to conduct current. The resulting current flow causes a voltage drop across sense resistor 61. Comparator 63 detect this voltage drop and responds by asserting the control signal 81 high to the gate drive voltage (12V). The voltage of the control signal 81 transitions from ground potential to twelve volts. This control signal 81 is supplied onto the LIN input of the low side driver in gate driver device 65, so that the low side driver drives the low side control signal 76 out of the LO output and onto the gates of FETs Q4A and Q4B, thereby turning FETs Q4A and Q4B on. The control signal 81 from comparator 63 is also supplied onto the HIN input of the high side driver in gate driver device 64. The high side driver therefore asserts the high side control signal 75 to be 11.3 volts higher than the voltage on the source of FET Q1, thereby turning FET Q1 on. At this point, FETs Q1, Q4A and Q4B are driven to be on and conductive, and FETs Q2 and Q3A and Q3B are controlled to be off and nonconductive. Current can flow from the AC IN− terminal, through FET Q1 and out of the VRECT+ terminal, then through the external load, and into the VRECT− terminal, through FETs Q4A and Q4B, and out of the AC IN+ terminal.

Figure 5:
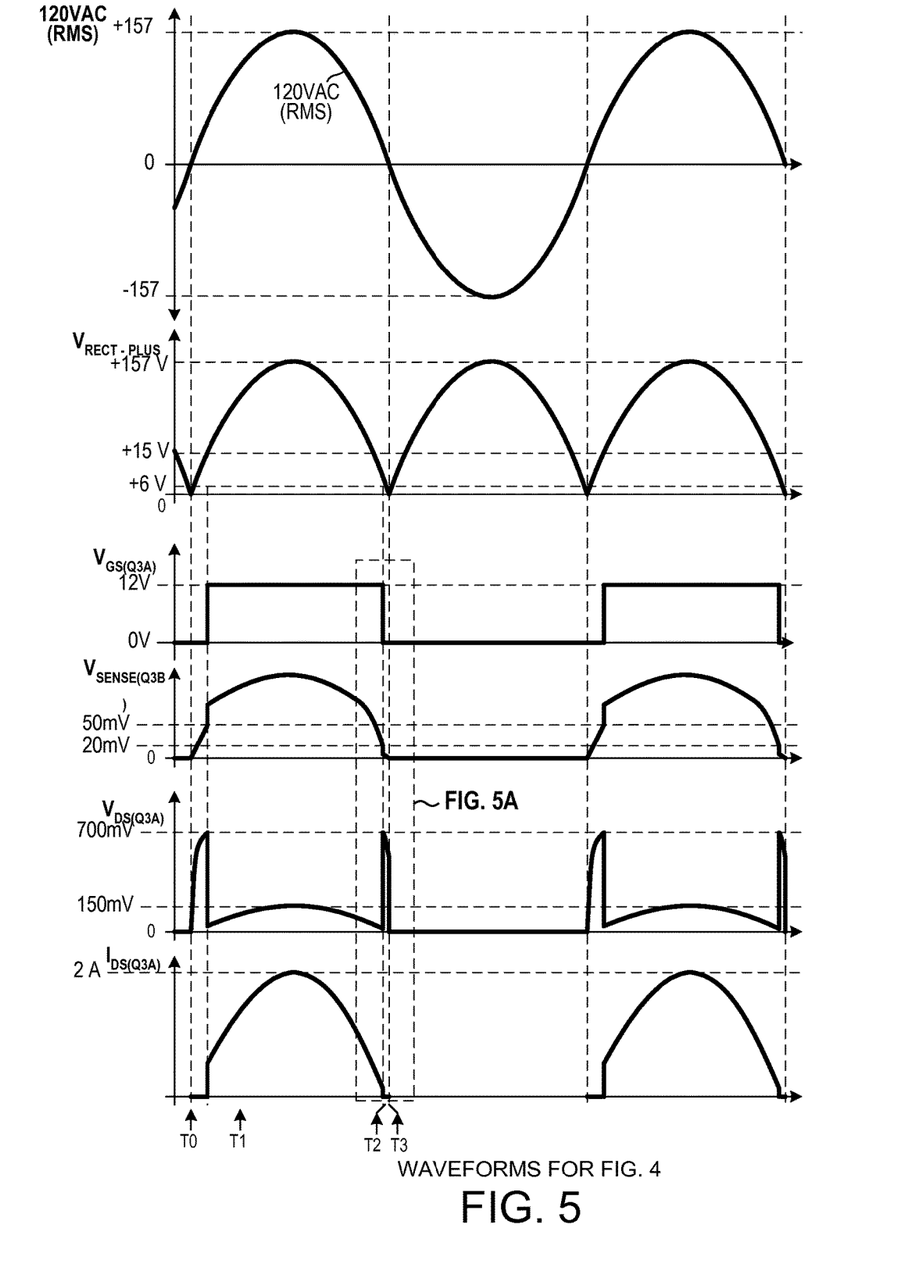
FIG. 5 is a waveform diagram that illustrates an operation of the full bridge rectifier module circuit of FIG. 4.
Figure 5A:
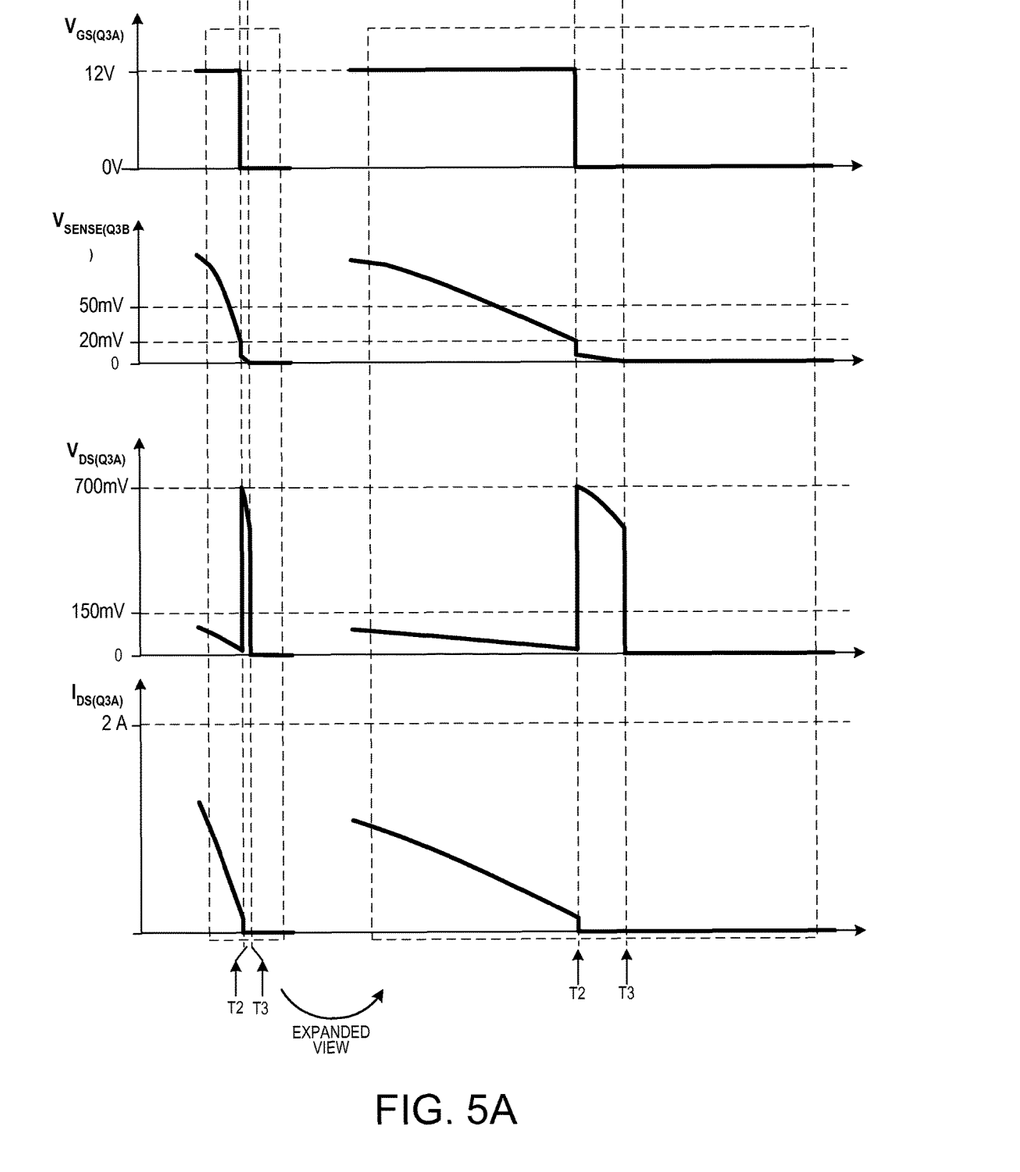
FIG. 5A is a waveform diagram that shows part of the waveform diagram of FIG. 5 in expanded fashion.

FIG. 5 is a simplified waveform diagram that illustrates this operation the full bridge rectifier module circuit 51 of FIG. 4. Waveforms for one of the rectifying FETs, FET Q3A, is illustrated. The waveform denoted $V_{SENSE(Q3B)}$ is the voltage drop across the sense resistor 60 that is in series with FET Q3B. In the illustrated example, the 120 VAC supply voltage is present on across the AC IN+ and AC IN− terminals. The portion of the waveforms of FIG. 5 that is shown surrounded by a dashed box labeled "FIG. 5A" is shown in expanded form in FIG. 5A. In the waveform labeled $V_{DS(Q3A)}$, note that the forward voltage across the rectifying FET Q3A is much smaller than one volt when FET Q3 is conducting, and is for most of the time it is conducting the forward voltage drop is 150 millivolts or less. The forward voltage drop across each of the rectifying FETs of the circuit is of this same approximate wave shape and magnitude. Due to the low forward voltage drops across the rectifying FETs in the module circuit 51, the module circuit 51 has lower power loss as compared to using a standard diode full bridge rectifier where the forward voltage drops across the rectifying diodes would be greater.

Although the present invention has been described in connection with certain specific embodiments for instructional purposes, the present invention is not limited thereto.

Accordingly, various modifications, adaptations, and combinations of various features of the described embodiments can be practiced without departing from the scope of the invention as set forth in the claims.

What is claimed is:

1. An apparatus comprising:
 a first Field Effect Transistor (FET) having a body diode, a source terminal, a drain terminal, and a gate terminal;
 a second FET having a body diode, a source terminal, a drain terminal, and a gate terminal, wherein the drain terminal of the second FET is coupled to the drain terminal of the first FET, and wherein the gate terminal of the second FET is coupled to the gate terminal of the first FET;
 a sense resistor having a first lead and a second lead, wherein the sense resistor is disposed in series with the body diode of the second FET; and
 a comparator having a first input lead, a second input lead, and an output lead, wherein the first input lead of the comparator is coupled to the first lead of the sense resistor, and wherein the second input lead of the comparator is coupled to the second lead of the sense resistor, wherein a control signal on the output lead of the comparator is supplied onto the gate terminals of the first and second FETs.

2. The apparatus of claim 1, further comprising:
 a gate driver, wherein the control signal on the output lead of the comparator is supplied via the gate driver onto the gate terminals of the first and second FETs.

3. The apparatus of claim 1, further comprising:
 a gate driver having an input lead and an output lead, wherein the input lead of the gate driver is coupled to the output lead of the comparator, and wherein the output lead of the gate driver is coupled to the gate terminals of the first and second FETs.

4. The apparatus of claim 1, wherein the first lead of the sense resistor is coupled to the source terminal of the second FET but is not coupled to the source terminal of the first FET.

5. The apparatus of claim 1, wherein the second lead of the sense resistor is coupled to the source terminal of the first FET.

6. The apparatus of claim 1, wherein the first FET has a first channel width, wherein the second FET has a second channel width, and wherein the second channel width is substantially smaller than the first channel width.

7. The apparatus of claim 6, wherein the first FET is a part of a first semiconductor die, and wherein the second FET is also a part of the first semiconductor die.

8. The apparatus of claim 7, wherein the comparator is a part of a second semiconductor die.

9. The apparatus of claim 7, wherein if a positive voltage exists between a first node and a second node then a first current path extends from the first node, through the sense resistor, through the second FET, and to the second node, and a second current path extends from the first node, through the first FET, and to the second node.

10. The apparatus of claim 6, wherein the apparatus is a multi-chip module, the apparatus further comprising:
 a first module package terminal that is coupled to the drain terminal of the first FET; and
 a second module package terminal that is coupled to the source terminal of the first FET.

11. The apparatus of claim 10, wherein the apparatus further comprises:
 a third module package terminal through which a DC supply voltage is received onto the module.

12. The apparatus of claim 11, wherein the apparatus has no more than three module package terminals.

13. The apparatus of claim 12, further comprising:
 a fourth module package terminal, wherein if a positive voltage is present on the first module package terminal with respect to the second module package terminal and if the DC supply voltage is present on the third module package terminal then: 1) the first FET is turned on if a first digital logic level is present on the fourth module package terminal, 2) otherwise if a second digital logic level is present on the fourth module package terminal then the first FET is turned off.

14. The apparatus of claim 1, wherein the first FET also has a first auxiliary source terminal, wherein the first auxiliary source terminal of the first FET is coupled to the second lead of the sense resistor, and wherein the source terminal of the second FET is coupled to the first lead of the sense resistor.

15. The apparatus of claim 14, wherein the first FET also has a second auxiliary source terminal, wherein the second auxiliary source terminal is coupled to a ground lead of the comparator.

16. The apparatus of claim 1, wherein the apparatus is a packaged semiconductor device, the apparatus further comprising:
 a first package terminal that is coupled to the drain terminal of the first FET;
 a second package terminal that is coupled to the source terminal of the first FET;
 a third package terminal through which a DC supply voltage is received onto the packaged semiconductor device; and
 an amount of encapsulant that encapsulates the first and second FETs, the sense resistor and the comparator.

17. An apparatus comprising:
 a first Field Effect Transistor (FET) having a body diode, a source terminal, a drain terminal, and a gate terminal;
 a second FET having a body diode, a source terminal, a drain terminal, and a gate terminal, wherein the drain terminal of the second FET is coupled to the drain terminal of the first FET, and wherein the gate terminal of the second FET is coupled to the gate terminal of the first FET; and
 means for detecting a current flow through the body diode of the second FET and in response to the detecting of the current flow controlling the first and second FETs to turn on, wherein the current flow does not flow through the first FET, and wherein the means is also for controlling the first and second FETs to be off if the current flow is not flowing through the body diode of the second FET.

18. The apparatus of claim 17, wherein the current flow through the body diode that is detected by the means is a current flow of at least a predetermined magnitude, wherein the means controls the first and second FETs to be off if a current flow through the body diode is less than the predetermined magnitude.

19. The apparatus of claim 17, further comprising:
 a first package terminal that is directly coupled to the drain terminal of the first FET and to the drain terminal of the second FET; and
 a second package terminal that is directly coupled to the source terminal of the first FET but that is not directly coupled to the source terminal of the second FET.

20. The apparatus of claim 19, wherein the first FET also has an auxiliary source terminal, and wherein the current flow detected by the means flows in a current path from the second package terminal, through the source terminal of the first FET, through the auxiliary source terminal of the first FET, across a current sensor, through the source terminal of the second FET, through the body diode of the second FET, through the drain terminal of the second FET, and to the first package terminal.

21. The apparatus of claim 17, wherein the means comprises:
a sense resistor; and
a comparator coupled to receive a voltage across the sense resistor.

22. The apparatus of claim 17, further comprising:
a control terminal, wherein the means is also for receiving a digital control signal from the control terminal, wherein if the digital control signal is asserted when the drain terminal of the first FET is at a higher voltage than the source terminal of the first FET then the means causes the first and second FETs to be turned on, whereas if the digital control signal is not asserted when the drain terminal of the first FET is at a higher voltage than the source terminal of the first FET then the means causes the first and second FETs to be off and nonconductive.

23. The apparatus of claim 17, wherein the apparatus is a three-terminal packaged semiconductor device that has three and only three package terminals.

24. The apparatus of claim 22, wherein the apparatus is a four-terminal packaged semiconductor device that has four and only four package terminals.

25. The apparatus of claim 17, wherein the first and second FETs are parts of a first semiconductor die, wherein the die has a first bond pad that is coupled to the drain terminals of the first and second FETs, wherein the die has a second bond pad that is coupled to the gate terminals of the first and second FETs, wherein the die has a third bond pad that is coupled to the source terminal of the first FET, and wherein the die has a fourth bond pad that is coupled to the source terminal of the second FET.

26. The apparatus of claim 25, wherein the die also has a fifth bond pad that is coupled to the source terminal of the first FET.

27. The apparatus of claim 26, wherein the current flow detected by the means flows in a current path from the second bond pad of the die, through the fifth bond pad of the die, through a current sensor, through the fourth bond pad of the die, through the body diode of the second FET, and to the first bond pad of the die.

28. A method comprising:
(a) detecting a current flow through a body diode of a second FET, wherein a drain electrode of the second FET is coupled to a drain electrode of a first FET, wherein a gate electrode of the second FET is coupled to a gate electrode of the first FET, and wherein the current flow detected in (a) does not flow through a body diode of the first FET; and
(b) in response to the detecting of (a) causing: 1) the first FET to be turned on, 2) the second FET to be turned on, and 3) a third FET to be turned on.

29. The method of claim 28, wherein the first FET is a part of a semiconductor die, wherein the second FET is a part of the semiconductor die, wherein the second FET is much smaller than the first FET, and wherein the third FET is not a part of the semiconductor die.

30. The method of claim 29, further comprising:
(c) detecting an absence of the current flow through the body diode of the second FET; and
(d) in response to the detecting of (c) causing the first, second and third FETs to be turned off.

31. The method of claim 28, wherein the first, second and third FETs are parts of a full bridge rectifier circuit, wherein the first, second and third FETs are controlled to be on and conductive during a first half cycle of an AC supply voltage present on input terminals of the full bridge rectifier circuit, and wherein the first, second and third FETs are controlled to be off and nonconductive during a second half cycle of the AC supply voltage.

* * * * *